July 29, 1952     W. J. MILLER ET AL     2,605,079

PISTON VALVE

Filed June 19, 1946

INVENTORS
WILLIAM J. MILLER
BY ALFRED C. JOHNSON
Fred C. Matheny
ATTORNEY

Patented July 29, 1952

2,605,079

UNITED STATES PATENT OFFICE 2,605,079

PISTON VALVE

William J. Miller and Alfred C. Johnson, Seattle, Wash., assignors to Elliott Bay Mill Co., Seattle, Wash., a corporation of Washington Application June 19, 1946, Serial No. 677,722

1 Claim. (Cl. 251—76)

This invention relates to piston valves and an object of this invention is to provide an air operated piston valve that is controlled by pilot valves and that is simple in construction and reliable and efficient in operation.

Another object is to provide a piston type air valve through which moisture, oil and foreign matter can pass freely without interfering with the operation of the valve, said piston valve being constructed so that it will not be blocked up by water and dirt or gummed up by oil.

Another object is to provide a valve that is particularly well adapted to control a flow of compressed air alternately to two conduits where one is always open to pressure and the other is always open to exhaust.

Another object is to provide a valve that is particularly well adapted for use with pneumatically operated mechanism of the type shown in United States Patent No. 2,394,234, issued February 5, 1946, or in United States Patent No. 2,394,558, issued February 12, 1946.

Another object is to provide a piston valve that is controlled by four pilot valves operating in pairs, and to provide a piston valve in which a piston is moved from one position to another by pressure of the fluid that is controlled by said piston valve.

Other objects will be apparent from the following description taken in connection with the accompanying drawings.

In the drawings.

Like reference numerals designate like parts throughout the several views.

Figure 1:
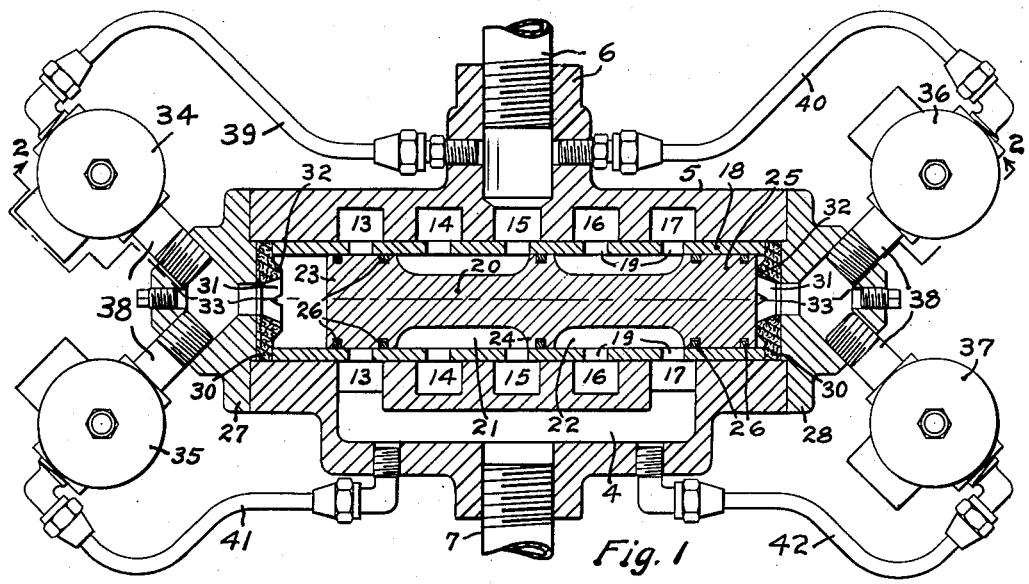
Figure 1 is a longitudinal sectional view of a piston valve constructed in accordance with this invention.

This piston valve comprises a tubular housing 5 having a compressed air inlet conduit 6, and a compressed air exhaust conduit 7. The housing 5 further has two service ports 8 and 9, Fig. 2, that are connected by suitable service conduits 10 and 11, Fig. 3, with means such as a cylinder 12, to which a supply of compressed air is to be controlled.

The tubular housing 5 is internally provided with five spaced apart annular grooves 13, 14, 15, 16 and 17. The exhaust port 7 communicates with the two grooves 13 and 17 by means of a manifold passageway 4 in the housing 5. This passageway is diagrammatically shown as a pipe in Fig. 3. The fluid pressure inlet conduit 6 communicates with the medial groove 15. The service ports 8 and 9 communicate respectively with the grooves 14 and 16.

A port sleeve 18 is snugly fitted within the valve housing 5 and is provided with five annular sets of openings 19. One set of these openings 19 registers with each groove 13 to 17. A piston 20 is reciprocably disposed within the port sleeve 18. The piston 20 is externally provided with two annular recesses 21 and 22 which are spaced from each other and terminate short of the ends of the piston so as to leave on the piston three spaced apart piston heads 23, 24 and 25 that have a working fit within the port sleeve 18. Piston rings 26 are provided on the piston heads 23, 24 and 25.

Two cylinder heads 27 and 28 are secured to opposite ends of the cylinder 5 by cap screws 29. Two bumpers 30 of duplicate construction are provided in the housing 5 between the respective cylinder heads 27 and 28 and the ends of the port sleeve 18. Each bumper 30 is preferably constructed of fibrous material. Each bumper 30 has a central opening 31 and is provided with an annular flange 32 against which the end of the adjacent piston head 23 or 25 bumps and each flange 32 preferably has radial notches 33 therein to allow the pressure of compressed air to be exerted against portions of the end of the piston heads toward the periphery thereof and outward from the bumper flanges 32.

Figure 3:
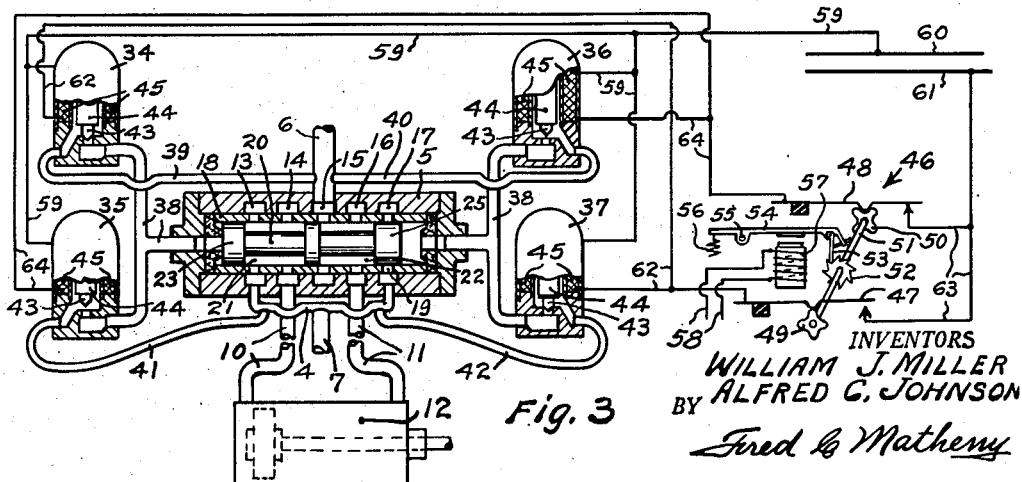
Fig. 3 is a diagrammatic view, partly in cross section, of this piston valve, together with pilot valves and electrical control mechanism connected with this valve and a pneumatic cylinder controlled by said valve.

Four electromagnetically operated pilot valves 34, 35, 36 and 37 are connected by conduits 38 with the cylinder heads 27 and 28. Other conduits 39 and 40 connect the two pilot valves 34 and 36 with the compressed air inlet conduit 6. Still other conduits 41 and 42 connect the two pilot valves 35 and 37, by way of the exhaust conduit means 4, with the two exhaust passageways or grooves 13 and 17 within the housing 5. In Fig. 3 the exhaust passageway 4 is diagrammatically shown as a pipe external to the housing 5 and the conduits 41, 42 and 7 are connected with this pipe. Obviously the two pilot valves 35 and 37 and the manifold passageway 4 can exhaust directly into the atmosphere. However it is preferable to use the conduits 41, 42 and 7, with the conduit 7 terminating at a location where the exhaust air will not be objectionable.

Each pilot valve 34, 35, 36 and 37 preferably comprises a valve member 43 connected with a solenoid plunger 44 and adapted to be moved from a closed to an open position by the energizing of a coil 45. Each valve 43 may close by gravity. The two pilot valves 34 and 36 control the admission of air under pressure by way of conduits 39, 40 and 38, to the two ends of the valve housing 5. The two pilot valves 35 and 37 control the exhaust of compressed air, by way of conduits 38, 41, 42, 4 and 7, from the two ends of the valve housing 5.

The energizing of the pilot valves 34, 35, 36 and 37 is controlled through switch means, Fig. 3, that controls two circuits and that will alternately close one of said circuits and open the other circuit. As illustrative of one type of switch that will operate in this manner a switch, Fig. 3, designated generally by 46 and herein referred to as a ratchet relay is shown. This ratchet relay 46 has two spring contactors 47 and 48 engaged by lobed wheels 49 and 50 on a common shaft 51. A ratchet wheel 52 on shaft 51 is engaged by a pawl 53 on an armature plate 54 that is pivoted at 55 and yieldingly held in an elevated position by a spring 56. An electromagnet 57 is provided for moving the armature plate 54 downwardly each time the electromagnet is energized to thereby impart to the shaft 51 a movement sufficient to close the circuit controlled by one of the contactors 47 or 48 and to open the circuit controlled by the other one of said contactors. The electromagnet 57 is connected, as by conductors 58, with any suitable switch means by which the operation of the pneumatic cylinder 12 is controlled.

As diagrammatically shown in Fig. 3, one terminal of the coil 45 of each pilot valve 34, 35, 36 and 37 is connected by conductor means 59 with one conductor 60 of a source of supply circuit. The other terminal of the coil of each of the two diagonally opposite pilot valves 34 and 37 is connected by conductor means 62 with one terminal of the switch formed by the contactor 47 and the other terminal of this switch is connected by a conductor 63 with the other conductor 61 of the source of supply circuit. The two diagonally opposite pilot valves 35 and 36 each have the other terminal of their coil 45 connected by conductor means 64 with one terminal of the switch formed by the contactor 48 and the other terminal of this switch is connected by the conductor 63 with the conductor 61 of the source of energy circuit.

Each time the ratchet relay 46 is operated it will energize the coils 45 of two diagonally opposite pilot valves and de-energize the coils 45 of the other two diagonally opposite pilot valves. When pilot valves 34 and 37 are energized and opened then compressed air will be admitted through conduit 39, valve 34 and one of the conduits 38 to the end of the valve housing 5 shown at the left in Figs. 1 and 2 and the end of the valve housing 5 shown at the right will communicate through one of the conduits 38, valve 37 and conduit 42 with the exhaust conduit 7. This will cause the valve piston 20 to be moved into the position shown in Figs. 1 and 2. In this position the piston 20 will establish communication from compressed air inlet port 6, through groove 15, through passageway 21 around piston 20, and through groove 14 to the service pipe 10 that is connected with one end of the pneumatic cylinder 12. At the same time said piston 20 will open a passageway for the escape of exhaust air from the other end of cylinder 12 through groove 16, passageway 22, groove 17 and conduits 4 and 7.

Figure 2:
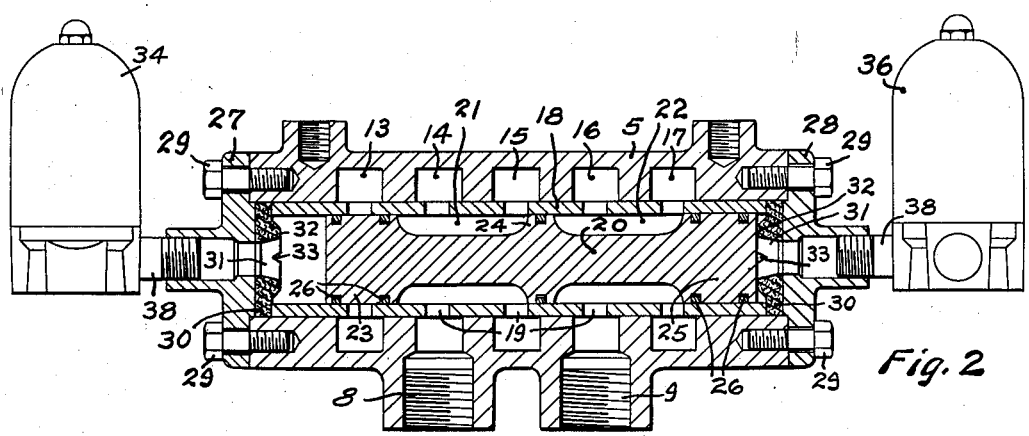
Fig. 2 is a longitudinal sectional view of said piston valve taken substantially on broken line 2—2 of Fig. 1 and showing two of the pilot valves in elevation.

When the pilot valves 34 and 37 are energized and the piston 20 is in the position shown in Figs. 1 and 2, then the next time the ratchet relay is operated it will energize the coils 45 of the pilot valves 35 and 36 and de-energize the coils 45 of the valves 34 and 35. This will reverse communication through the pilot valves as respects inlet and exhaust of air under pressure and leave the valves 43 in the positions in which they are shown in Fig. 3. Compressed air will then be admitted through conduit 40 valve 36 and one of the conduits 38 to the end of the valve housing shown at the right in the drawings. At the same time the end of the valve housing 5 shown at the left will be opened to exhaust through one of the conduits 38, valve 35 and conduit 41.

This will move the piston 20 to the limit of its movement to the left and establish communication to the cylinder 12 as follows: Air under pressure from inlet 6 will flow through groove 15, passageway 22, groove 16 and conduit 11 to the right end of cylinder 12 and the left end of said cylinder 12 will be open to exhaust by way of conduit 10, groove 14, passageway 21, groove 13 and exhaust conduits 4 and 7.

The pilot valves thus operate in pairs to control the movement of the piston 20 and the piston controls the inlet and exhaust of air to the device to be operated, such as the cylinder 12. The passageways through the piston valve are of large size and liquids, such as water and oil, will pass through this valve freely without clogging the same.

Obviously changes in this invention may be made within the scope and spirit of the following claim.

We claim:

In a piston valve, a tubular housing; five spaced apart annular grooves in the inner circumferential wall of said housing; a port sleeve of shorter length than said housing closely fitted therein; five annular rows of perforations in said sleeve registering with with housing grooves respectively; two washer shaped bumper members disposed in the end portions of said housing and resting against the respective ends of said port sleeve; a centrally disposed inwardly projecting annular transversely notched bumper flange on each bumper; two caps secured to the respective end portions of said housing and supporting said bumper members; a port through each of said caps and bumpers; a piston slidably movable in said port sleeve, said piston having its end portions positioned for contact with the notched flanges of said bumper members whereby movement of said piston is limited; two annular circumferential grooves on said piston providing on said piston two end head members of substantial length and a shorter medial head member, said piston grooves being of sufficient length to overlap two adjacent rows of perforations in said port sleeve; fluid pressure inlet conduit means through said tubular housing connected with the medial annular groove in said tubular housing; fluid pressure exhaust means through said tubular housing communicating respectively with the two annular grooves adjacent the ends of said housing; and two service conduits through said tubular housing connected respectively with the two annular grooves which are positioned between the medial groove and the end grooves of said housing, whereby said service conduits are alternately communicatively connected with said fluid pressure inlet conduit and said fluid pressure exhaust means by said piston grooves in response to longitudinal movement of said piston in said port sleeve.

WILLIAM J. MILLER.
ALFRED C. JOHNSON.

REFERENCES CITED

The following references are of record in the file of this patent:

UNITED STATES PATENTS

| Number | Name | Date |
|---|---|---|
| 465,232 | Aiken | Dec. 15, 1891 |
| 622,165 | Phillips | Mar. 28, 1899 |
| 696,847 | Spencer | Apr. 1, 1902 |
| 1,293,178 | Osborne | Feb. 4, 1919 |
| 1,484,533 | Randall | Feb. 19, 1924 |
| 1,716,010 | Smeby | June 4, 1929 |
| 2,145,977 | Foster | Feb. 7, 1939 |
| 2,157,240 | Keel | May 9, 1939 |
| 2,339,353 | Ray | Jan. 18, 1944 |
| 2,357,986 | Wichterman | Sept. 12, 1944 |
| 2,409,517 | Schmit | Oct. 15, 1946 |